(12) United States Patent
Yokozawa et al.

(10) Patent No.: US 8,163,440 B2
(45) Date of Patent: Apr. 24, 2012

(54) FUEL CELL AND CONTROL METHOD THEREFOR

(75) Inventors: Mitsuo Yokozawa, Nagano (JP); Kenji Muramatsu, Nagano (JP)

(73) Assignees: Nidec Sankyo Corporation (JP); Panasonic Corporation (JP)

( * ) Notice: Subject to any disclaimer, the term of this patent is extended or adjusted under 35 U.S.C. 154(b) by 755 days.

(21) Appl. No.: 12/246,102

(22) Filed: Oct. 6, 2008

(65) Prior Publication Data
US 2009/0035629 A1 Feb. 5, 2009

Related U.S. Application Data

(63) Continuation-in-part of application No. 11/176,504, filed on Jul. 7, 2005, now abandoned.

(30) Foreign Application Priority Data

Jul. 15, 2004 (JP) ................................. 2004-208551

(51) Int. Cl.
*H01M 8/04* (2006.01)
(52) U.S. Cl. ...................................................... 429/513
(58) Field of Classification Search .................. 429/423, 429/409, 513
See application file for complete search history.

(56) References Cited

U.S. PATENT DOCUMENTS

| | | | |
|---|---|---|---|
| 2,502,316 A | 3/1950 | Erikson | |
| 3,320,892 A | 5/1967 | Wolff | |
| 4,233,002 A | 11/1980 | Birenbaum | |
| 4,255,088 A * | 3/1981 | Newton et al. | 417/1 |
| 5,456,581 A | 10/1995 | Jokela et al. | |
| 5,477,829 A * | 12/1995 | Hassinger et al. | 123/467 |
| 6,322,336 B1 * | 11/2001 | Huss | 417/442 |
| 6,443,717 B1 | 9/2002 | Barber | |
| 2002/0187374 A1* | 12/2002 | Yamauchi et al. | 429/22 |
| 2006/0013703 A1* | 1/2006 | Yokozawa et al. | 417/274 |
| 2009/0123299 A1* | 5/2009 | Yokozawa et al. | 417/53 |
| 2009/0130532 A1* | 5/2009 | Yokozawa et al. | 429/34 |
| 2009/0148321 A1* | 6/2009 | Muramatsu et al. | 417/502 |
| 2009/0253019 A1* | 10/2009 | Yokozawa et al. | 429/34 |
| 2009/0317687 A1* | 12/2009 | Yokozawa et al. | 429/34 |

FOREIGN PATENT DOCUMENTS

| | | |
|---|---|---|
| JP | 2004-071262 | 3/2004 |
| JP | 2004-127618 | 4/2004 |
| JP | 2004-152741 | 5/2004 |

* cited by examiner

*Primary Examiner* — Chandrika Prasad
(74) *Attorney, Agent, or Firm* — Cantor Colburn LLP

(57) ABSTRACT

A multi-channel pump includes a pump chamber, an inflow passage connected to the pump chamber, two or more outflow passages connected to the pump chamber, outflow side active valves provided so as to correspond to the outflow passages, and a movable body reciprocated to change a volumetric capacity of the pump chamber. The movable body may be a piston reciprocated within a cylinder that is connected to the pump chamber. A control method for a multi-channel pump includes an initial discharge step between a suction step and a discharge step. The multi-channel pump may be preferably utilized in a fuel cell.

18 Claims, 8 Drawing Sheets

[Fig. 1]
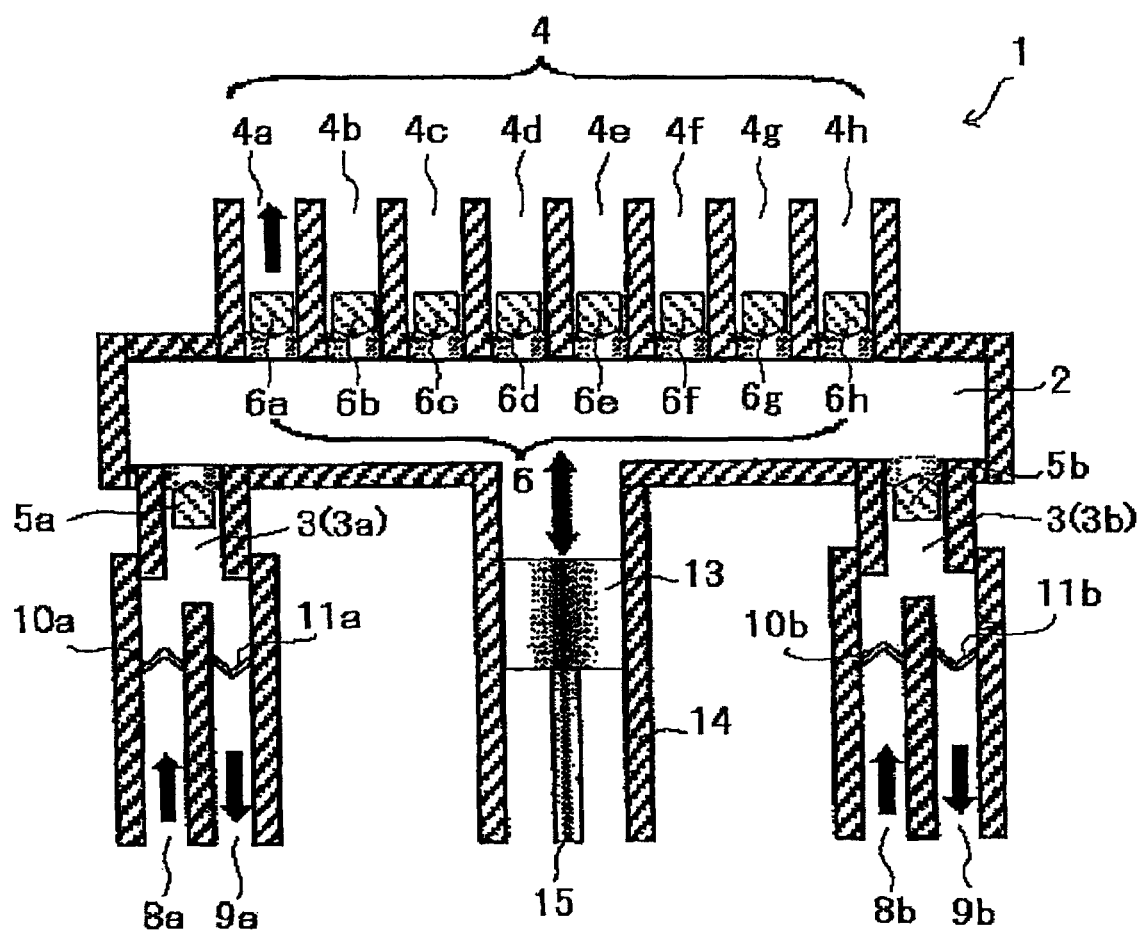

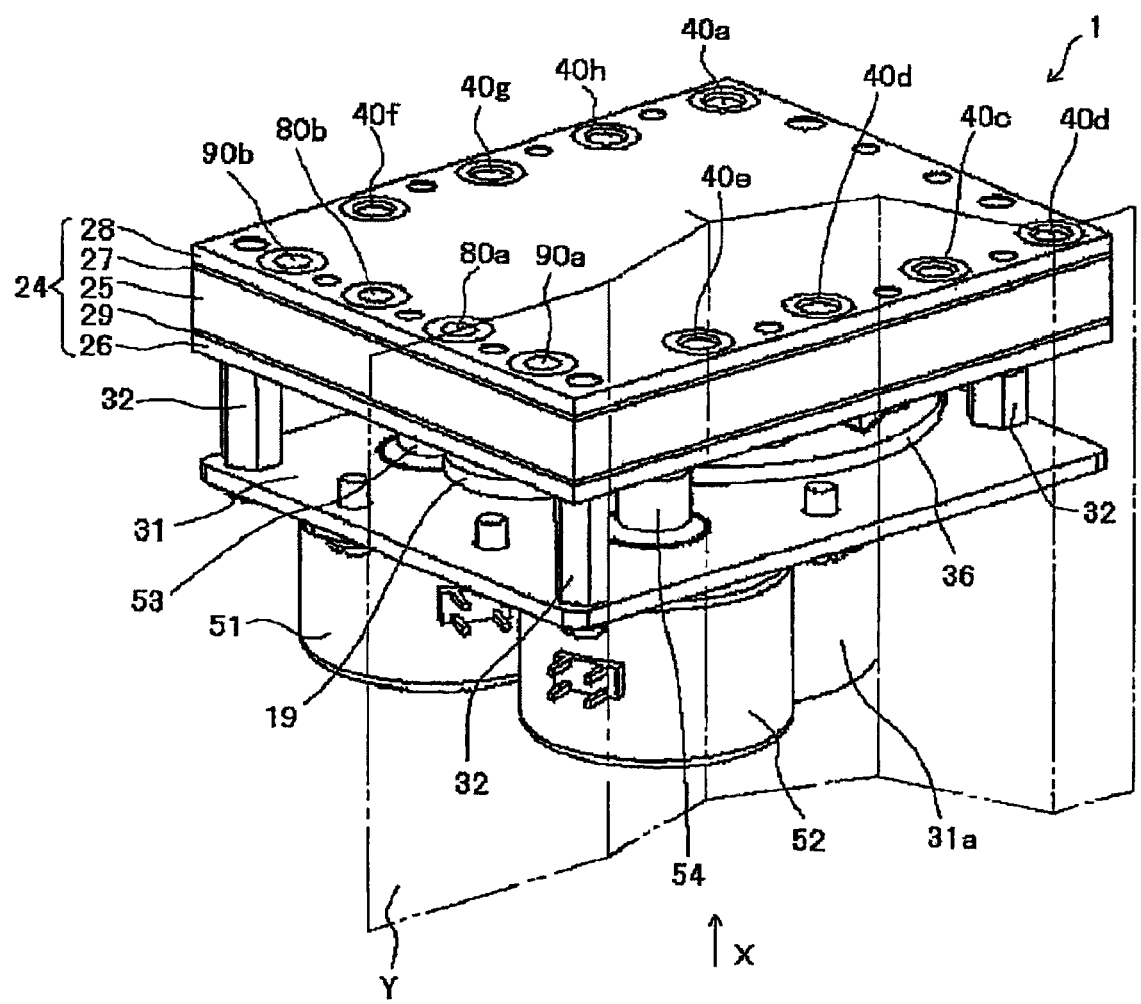
[Fig. 2]

[Fig.3]
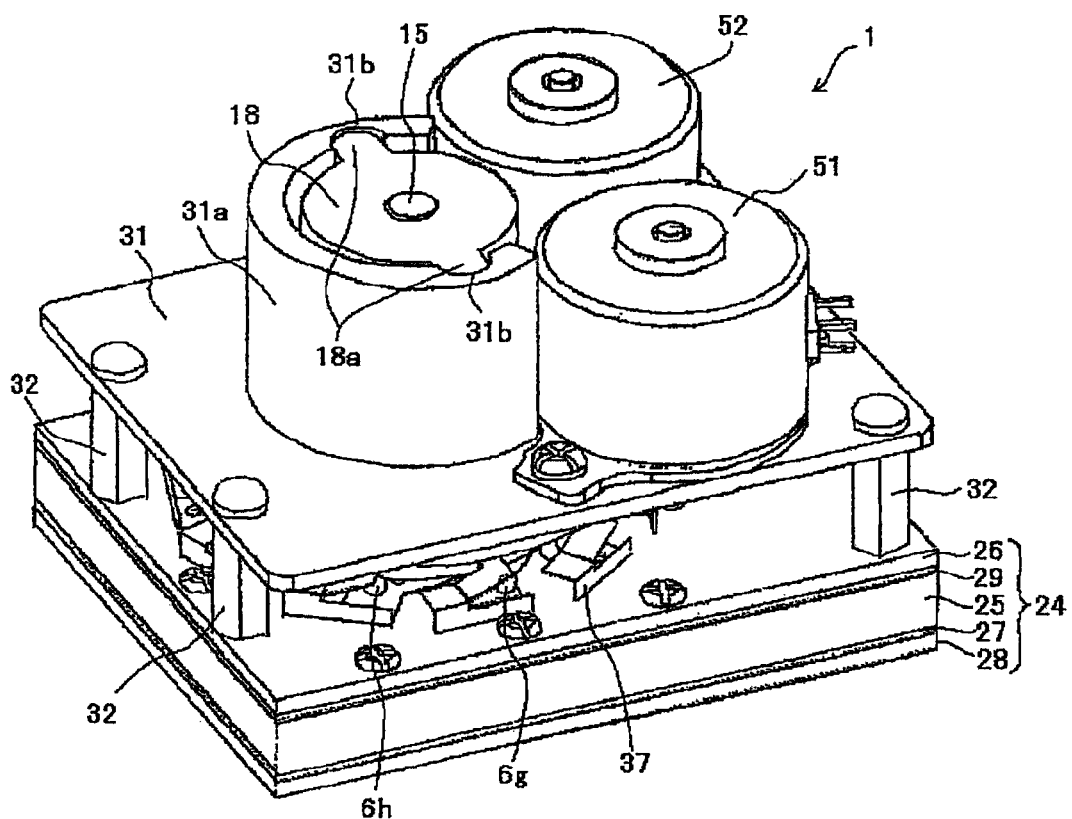

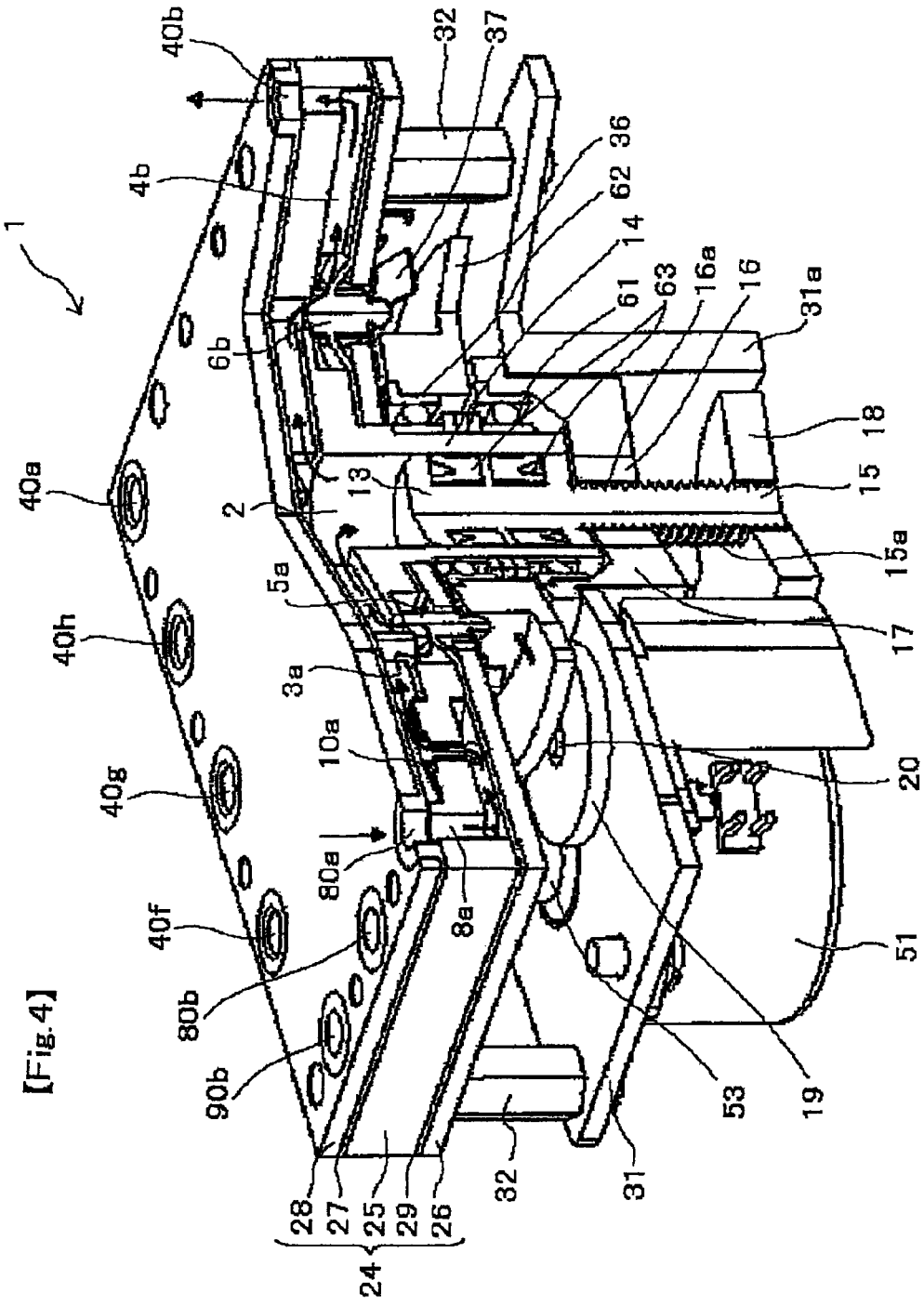
[Fig.4]

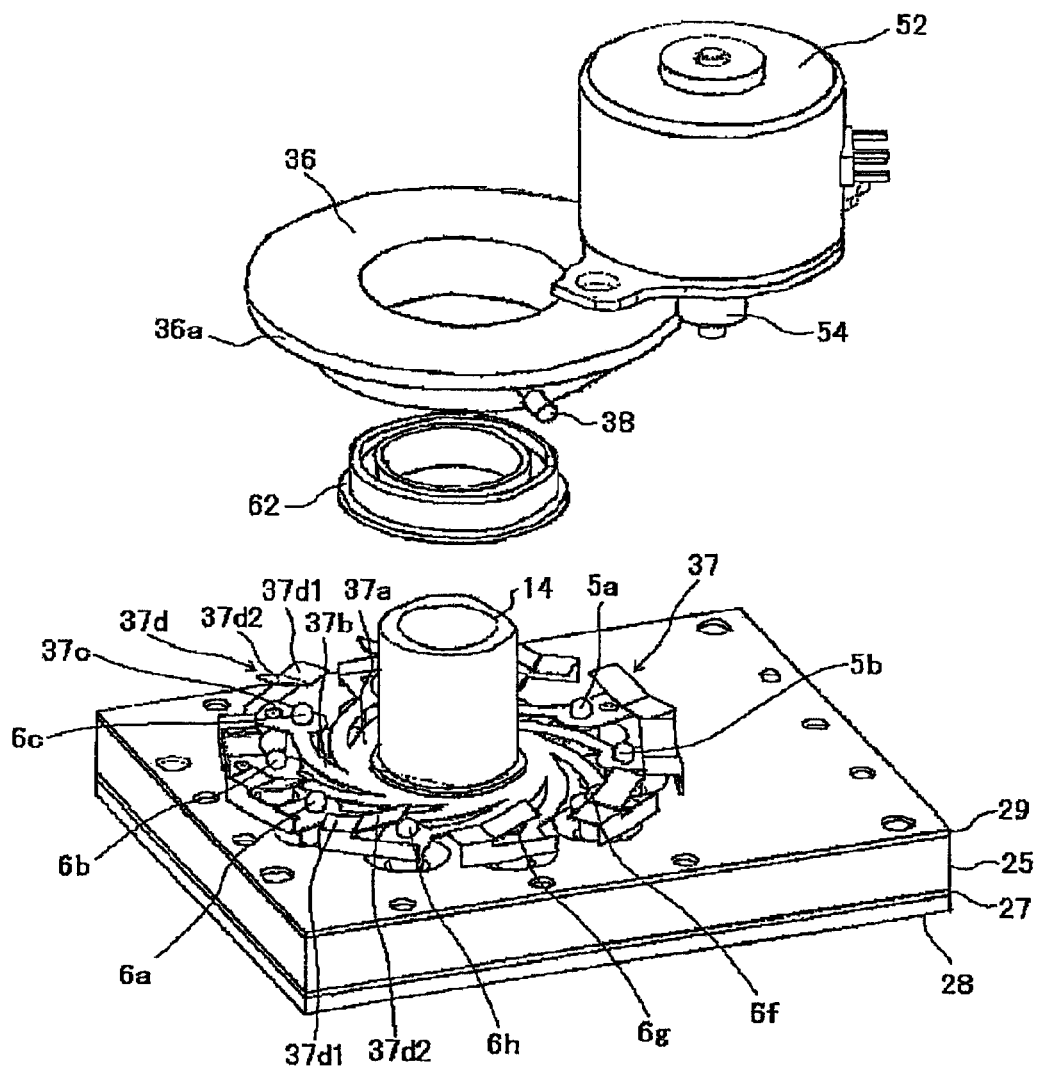
[Fig.5]

[Fig.6]
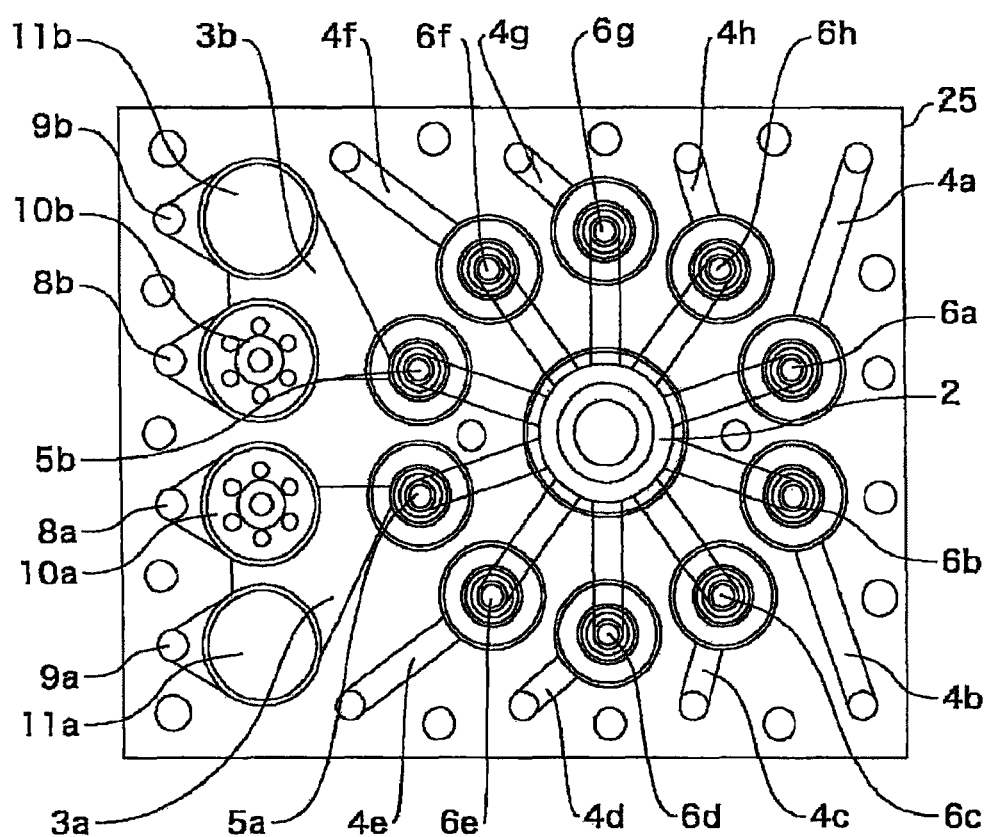

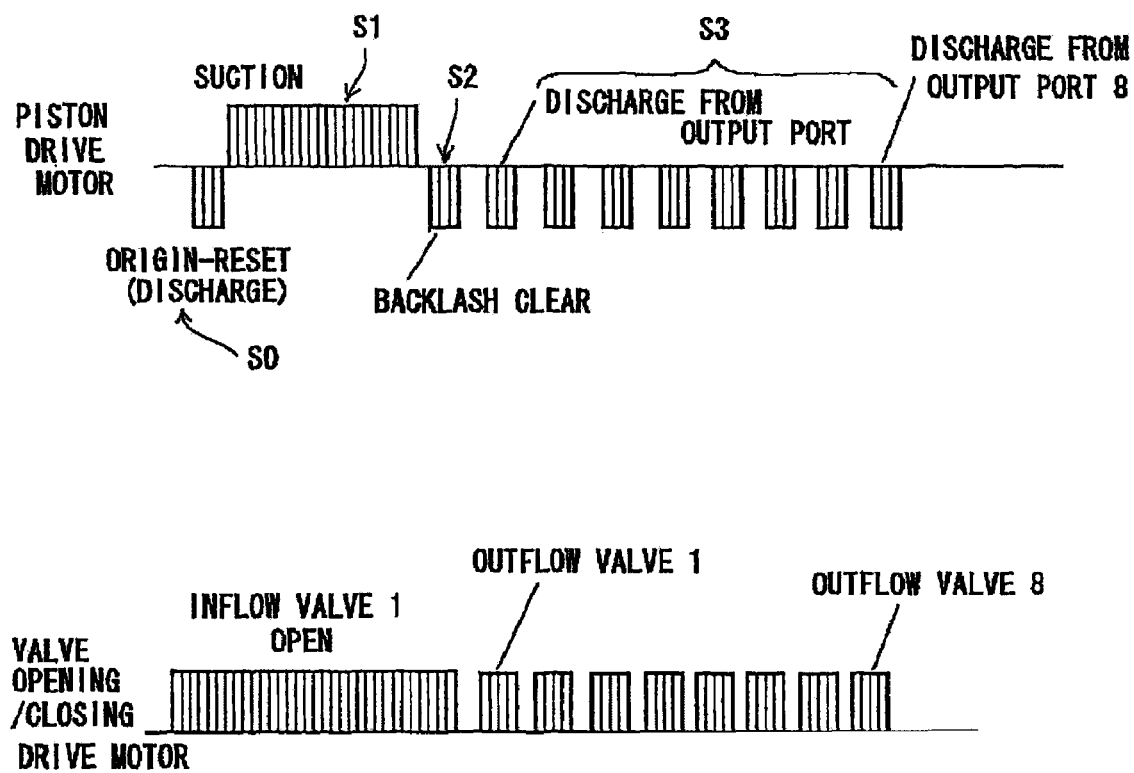
[Fig.7]

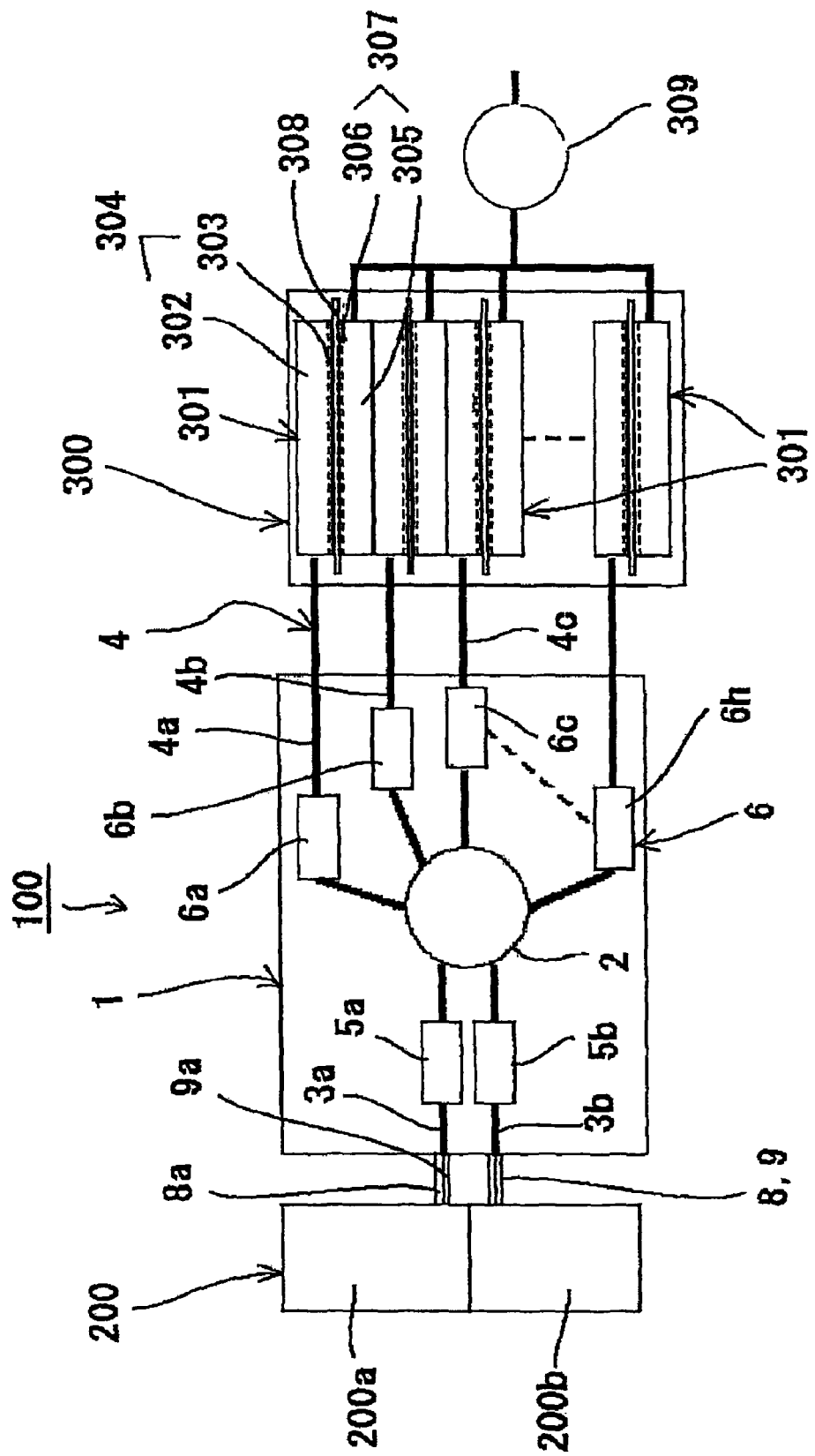
[Fig.8]

FUEL CELL AND CONTROL METHOD THEREFOR

CROSS REFERENCE TO RELATED APPLICATION

This is a Continuation-In-Part application of U.S. application Ser. No. 11/176,504, filed on Jul. 7, 2005, priority to which is claimed herein and the contents of which are incorporated by reference herein. U.S. application Ser. No. 11/176,504 claims priority under 35 U.S.C. §119 to Japanese Application No. 2004-208551 filed Jul. 15, 2004, priority to which is claimed herein and the disclosure of which is also incorporated herein by reference.

FIELD OF THE INVENTION

The present invention relates to a multi-channel pump which is used in a direct methanol type fuel cell or the like, a fuel cell and a control methods for the multi-channel pump and the fuel cell.

In the present specification, the "multi-channel pump" means a pump which is provided with a plurality of outflow passages for discharging fluid.

BACKGROUND OF THE INVENTION

Expectation for a fuel cell has been elevated as a power supply for a portable electronic device used in information society in recent years or as a power supply for coping with air pollution or global warming. Among the fuel cells, a direct methanol type fuel cell (hereinafter, referred to as DMFC: Direct Methanol Fuel Cell) in which power generation is performed by directly taking out protons from methanol provides characteristics that a reformer is not required and the volume energy density is high and thus application to a portable electronic device has been increasingly expected.

Various DMFC's have been proposed which are provided with a power generating device having a power generating part (cell), an accommodating vessel for accommodating methanol or methanol aqueous solution (hereinafter, referred to as methanol), and a liquid feed pump for feeding methanol forcibly from the accommodating vessel (see, for example, Japanese Patent Laid-Open No. 2004-71262, Japanese Patent Laid-Open No. 2004-127618, and Japanese Patent Laid-Open No. 2004-152741).

The cell includes an anode electrode (fuel electrode) having an anode collector and an anode catalyst layer, a cathode electrode (air electrode) having a cathode collector and a cathode catalyst layer, and an electrolyte membrane disposed between the anode electrode and the cathode electrode. Methanol is supplied to the anode electrode by a liquid feed pump and air is supplied to the cathode electrode by an air supply pump.

The activity of methanol oxidation is low in the anode electrode of the cell which is the power generating part of an above-mentioned DMFC and thus a voltage loss occurs. Further, a voltage loss occurs in the cathode electrode. Therefore, an output capable of being obtained from one cell becomes extremely low. Accordingly, a plurality of cells is used in the DMFC to obtain a prescribed output.

When methanol is excessively supplied to the anode electrode, a so-called crossover occurs which means that a part of the methanol transmits through the electrolyte membrane in an unreacted state and leaks to the cathode electrode. Since the crossover causes the electric potential of the cathode electrode to decrease, the voltage loss occurs in the cathode electrode. Further, unreacted methanol that reaches the cathode electrode is not related to power generation but reacts with oxygen to generate heat, and thus the power-generating efficiency in the cell is significantly reduced by the crossover. Accordingly, it is preferable not to supply excessive methanol to the anode electrode.

As described above, as a liquid feed pump for supplying methanol to the anode electrode of a cell, it has been desired which is provided with characteristics that discharge to a plurality of cells is possible and an appropriate amount of methanol can be accurately discharged. However, the liquid feed pump having such characteristics has not been proposed.

SUMMARY OF THE INVENTION

In view of the problems described above, at least an embodiment of the present invention may advantageously provide a multi-channel pump which is provided with a plurality of outflow passages for discharging fluid and capable of accurately discharging an appropriate amount of fluid and provide a fuel cell and a control methods for the multi-channel pump and the fuel cell.

Further, at least an embodiment of the present invention may advantageously provide a multi-channel pump which is capable of being mounted in a small-sized direct methanol fuel cell (DMFC) or the like that is used in a portable electronic device or the like, and a fuel cell and control methods for the multi-channel pump and the fuel cell.

Thus, according to at least an embodiment of the present invention, there may be provided a multi-channel pump including a pump chamber, an inflow passage for fluid which is connected to the pump chamber, two or more outflow passages which are connected to the pump chamber, outflow side active valves which are provided in the outflow passages so as to correspond to the outflow passages, and a movable body for changing the volumetric capacity of the pump chamber.

Further, according to at least an embodiment of the present invention, there may be provided a fuel cell including a cell, a liquid feed pump and an air supply pump. The cell includes an anode electrode having an anode collector and an anode catalyst layer, a cathode electrode having a cathode collector and a cathode catalyst layer, and an electrolyte membrane which is disposed between the anode electrode and the cathode electrode. The liquid feed pump is provided for supplying liquid to the anode electrode and the air supply pump is provided for supplying air to the cathode electrode. In addition, the liquid feed pump is a multi-channel pump which includes a pump chamber, an inflow passage for fluid connected to the pump chamber, two or more outflow passages connected to the pump chamber, outflow side active valves provided so as to correspond to the outflow passages, and a movable body for changing a volumetric capacity of the pump chamber. In the fuel cell in accordance with an embodiment of the present invention, methanol or methanol aqueous solution is used for the liquid. Further, in the fuel cell in accordance with an embodiment, the number of the movable body in the liquid feed pump is one.

In accordance with an embodiment of the present invention, the multi-channel pump is provided with two or more outflow passages which are connected to a pump chamber through outflow side active valves. Accordingly, the reverse flow of the fluid can be surely prevented when the outflow side active valve is closed. Further, the discharge destination of the fluid discharged from the outflow passage can be controlled by the outflow side active valve. In addition, the multi-channel pump is provided with one movable body which is reciprocated to change the volume of the pump chamber. Therefore, since the fluid is discharged from the respective outflow passages by using one movable body, the discharging performance becomes uniform and thus the variation of the discharge amount from the respective outflow passages is restrained and an appropriate amount of fluid can be accurately discharged.

Further, in accordance with an embodiment of the present invention, an inflow passage is connected to the pump chamber to which a plurality of outflow passages are connected. Therefore, the inflow passage can be provided in common for the plurality of outflow passages and thus the structure of the pump can be simplified. In addition, when the number of the movable body in the liquid feed pump is one, the structure of the pump is also simplified. Accordingly, the downsizing of the pump can be attained and the pump can be mounted in a small-sized device such as a DMFC that is used in a portable electronic device.

In accordance with an embodiment of the present invention, the movable body is reciprocated to change the volumetric capacity of the pump chamber. In this case, the movable body is preferably a piston which is reciprocated within a cylinder that is connected to the pump chamber. When the movable body is a piston, the moving quantity of the piston is relatively easy to control and thus a minute flow rate can be accurately discharged.

In accordance with an embodiment of the present invention, the multi-channel pump preferably includes a piston rod to which the piston is fixed, a male screw formed on the outer peripheral part of the piston rod, a rotation body which is formed with a female screw threadedly engaging with the male screw to make the piston reciprocate, and a piston drive motor which drives the rotation body to rotate. In this case, the moving quantity of the piston can be controlled by the pitch of the screw and the rotation quantity of the piston drive motor and thus a minute flow rate can be accurately discharged with a simple structure.

In accordance with an embodiment of the present invention, a protruded part is formed in the piston rod and a recessed part provided in a bracket is integrally structured with the drive motor, and the protruded part is engaged with the recessed part to prevent rotation of the piston.

In accordance with an embodiment of the present invention, the piston drive motor is preferably a stepping motor. In this case, the moving quantity of the piston can be further accurately controlled.

In accordance with an embodiment of the present invention, the multi-channel pump is preferably provided with two or more inflow passages. According to the construction described above, for example, when fluid accommodating vessels are respectively connected to the respective inflow passages, the fluid accommodating vessel can be easily replaced.

In accordance with an embodiment of the present invention, the pump chamber is formed at a roughly center portion of a base plate in which the two or more inflow passages and the two or more outflow passages are formed, and the two or more inflow passages and the two or more outflow passages are formed from the pump chamber in a radial manner.

In accordance with an embodiment of the present invention, the inflow passage is preferably connected to the pump chamber through an inflow side active valve. In this case, the reverse flow from the pump chamber to the inflow passage can be surely prevented in comparison with the case where the inflow passage is connected to the pump chamber through a passive valve.

Further, according to the present invention, there may be provided a control method for a multi-channel pump and a fuel cell including a suction step in which the inflow side active valve is opened and the fluid is sucked into the pump chamber by a suction operation of the movable body and then the inflow side active valve is closed, a plurality of discharge steps which are performed after the suction step so that predetermined outflow side active valves are successively opened to discharge a specified quantity of the fluid by discharge operation of the movable body. According to the control method described above, fluid is collectively sucked in the suction step which is required to discharge from the outflow passages by a plurality of times in the discharge step. Therefore, even when the discharge amount of the fluid which is discharged from the respective outflow passages is a significantly small amount, the suction amount can be ensured to some extent. Accordingly, the capacity of the multi-channel pump can be increased and the self-feeding performance can be easily attained.

In this case, it is preferable that a first discharge step of a plurality of the discharge steps which is performed first is an initial discharge step in which one of the outflow side active valves is opened to discharge the fluid from the pump chamber with the discharge operation of the movable body for eliminating a backlash of the pump.

According to the control method described above, the initial discharge step for eliminating the backlash of the pump is provided between the suction step and the discharge step. Therefore, the relationship between the moving quantity of the movable body and the discharge amount from the outflow passage can be maintained in a linear manner from the beginning of the discharge step. Accordingly, when the moving quantity of the movable body is appropriately controlled, the discharge amount from the outflow passage where the fluid is firstly discharged in the discharge step can be accurately controlled and thus the variation of the discharge amounts from the respective outflow passages can be reduced.

In the present specification, "backlash of a pump" means a phenomenon that, when the operation of the movable body is changed from suction to discharge, a linear relationship is not obtained between the moving quantity of the movable body and the discharge amount from the outflow passage. This is a phenomenon occurred by the backlash of a mechanism for driving the movable body.

In accordance with an embodiment of the present invention, the multi-channel pump may include a first flow passage provided in the inflow passage and having a passive valve which is capable of opening in an inflow direction to the pump chamber, and a second flow passage provided in the inflow passage and having a passive valve which is capable of opening in an outflow direction from the pump chamber.

Further, according to at least an embodiment of the present invention, there may be provided a control method for a multi-channel pump and a fuel cell including a suction step in which the inflow side active valve is opened and the fluid is sucked into the pump chamber from a first flow passage by a suction operation of the movable body, and a plurality of discharge steps which are performed after the suction step so that predetermined outflow side active valves are successively opened to discharge a specified quantity of the fluid by discharge operation of the movable body. According to the control method described above, fluid is collectively sucked in the suction step which is required to discharge from the outflow passages by a plurality of times in the discharge step. Therefore, even when the discharge amount of the fluid which is discharged from the respective outflow passages is a significantly small amount, the suction amount can be ensured to some extent. Accordingly, the capacity of the multi-channel pump can be increased and the self-feeding performance can be easily attained.

In this case, it is preferable that a first discharge step of a plurality of the discharge steps which is performed first is an initial discharge step in which one of the outflow side active valves is opened to discharge the fluid from the pump chamber with the discharge operation of the movable body for eliminating a backlash of the pump.

According to this control method of at least an embodiment of the present invention, the initial discharge step for eliminating the backlash of the pump is provided between the suction step and the discharge step. Therefore, the relationship between the moving quantity of the movable body and the discharge amount from the outflow passage can be maintained in a linear manner from the beginning of the discharge step. Accordingly, when the moving quantity of the movable body is appropriately controlled, the discharge amount from the outflow passage where the fluid is firstly discharged in the discharge step can be accurately controlled and thus the variation of the discharge amounts from the respective outflow passages can be reduced.

In accordance with an embodiment of the present invention, the first flow passage and the second flow passage are connected to an accommodating container, and the first flow passage is connected with a lower part of the accommodating container and the second flow passage is connected with an upper part of the accommodating container. Further, in accordance with an embodiment of the present invention, the first flow passage and the second flow passage are connected to an accommodating container in which methanol or methanol aqueous solution is accommodated, and the first flow passage is connected with a lower part of the accommodating container and the second flow passage is connected with an upper part of the accommodating container.

In accordance with an embodiment of the present invention, the inflow passage comprises two or more inflow passages, and at least one of the inflow passages is connected to a first accommodating container, and another of the inflow passages is connected with a second accommodating container. In accordance with an embodiment of the present invention, the inflow passage comprises two or more inflow passages, and at least one of the inflow passages is connected to a first accommodating container in which methanol or methanol aqueous solution is accommodated, and another of the inflow passages is connected with a second accommodating container.

In accordance with an embodiment of the present invention, an outflow port which is an aperture end of the outflow passage, an suction port which is an aperture end of the first flow passage and a discharge port which is an aperture end of the second flow passage are formed in a same direction.

In accordance with an embodiment of the present invention, the fluid is liquid and a detector for detecting presence of bubbles may be provided in the pump chamber.

As described above, in the multi-channel pump and the fuel cell in accordance with at least an embodiment of the present invention, since two or more outflow passages are connected to the pump chamber through the outflow side active valves, the reverse flow of fluid can be surely prevented when the outflow side active valves are closed and the discharge destination of the fluid discharged from the outflow passage can be controlled by using the outflow side active valve. In addition, the multi-channel pump is provided with one movable body that is reciprocated to change the volume of the pump chamber. Therefore, the discharging performance becomes uniform and thus the variation of discharge amount from the respective outflow passages can be restrained and an appropriate amount of fluid can be accurately discharged.

Further, in the multi-channel pump and the fuel cell in accordance with at least an embodiment of the present invention, an inflow passage is connected to the pump chamber to which a plurality of outflow passages are connected. Therefore, the inflow passage can be provided in common for the plurality of outflow passages and thus the structure of the pump can be simplified. In addition, since only one movable body is provided, the structure of the pump is also simplified. As a result, the downsizing of the pump can be attained.

Further, in the control method for the multi-channel pump of at least an embodiment of the present invention, the initial discharge step for eliminating the backlash of the pump is provided between the suction step and the discharge step. Therefore, the relationship between the moving quantity of the movable body and the discharge amounts from the outflow passages can be maintained in a linear manner from the beginning of the discharge step. Accordingly, the discharge amount from the outflow passage where the fluid is firstly discharged in the discharge step can be also accurately controlled and thus the variation of the discharge amounts from the respective outflow passages can be reduced. As a result, an appropriate amount of fluid can be accurately discharged from the respective outflow passages.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a schematic view showing a basic structure of a multi-channel pump in accordance with an embodiment of the present invention.

FIG. 2 is a perspective view showing a concrete structure of the multi-channel pump shown in FIG. 1 which is viewed from the discharge side of methanol.

FIG. 3 is a perspective view showing the multi-channel pump shown in FIG. 2 which is viewed from the "X" direction.

FIG. 4 is a perspective view showing the multi-channel pump shown in FIG. 2 which is cut in the "Y" cross section.

FIG. 5 is an exploded perspective view showing an opening/closing mechanism of active valves of the multi-channel pump shown in FIG. 2.

FIG. 6 is a plan view showing a structure of inflow passages and outflow passages of the multi-channel pump shown in FIG. 2.

FIG. 7 is a timing chart showing a control method of the multi-channel pump shown in FIG. 2.

FIG. 8 is a schematic view showing a basic structure of a fuel cell in accordance with an embodiment of the present invention.

DETAILED DESCRIPTION OF THE PREFERRED EMBODIMENTS

An embodiment of the present invention will be described below with reference to the accompanying drawings.

FIG. 1 is a schematic view showing a basic structure of a multi-channel pump in accordance with an embodiment of the present invention. Further, FIG. 8 is a schematic view showing a basic structure of a fuel cell in accordance with an embodiment of the present invention.

A multi-channel pump 1 (pump 1) in accordance with an embodiment of the present invention is used as a liquid feed pump for feeding methanol forcibly in a direct methanol fuel cell (DMFC) 100 used, for example, in a portable electronic device. The multi-channel pump 1 includes a pump chamber 2, inflow passages 3 connected to the pump chamber 2, two or more outflow passages 4 connected to the pump chamber 2 through outflow side active valves 6, and a movable body 13 which is reciprocated to change the volumetric capacity of the pump chamber 2. More concretely, two inflow passages 3a, 3b are connected to a pump chamber 2 and eight outflow passages 4a through 4h are connected to the pump chamber 2 through eight outflow side active valves 6a through 6h.

One end sides of the inflow passages 3a, 3b (upper end side in the drawing) are connected to the pump chamber 2 through inflow side active valves 5a, 5b. The other end sides of the inflow passages 3a, 3b are connected to first flow passages 8a, 8b (first flow passage 8) provided with passive valves 10a, 10b (passive valve 10) which respectively open in an inflow direction to the pump chamber and connected to second flow passages 9a, 9b (second flow passage 9) provided with passive valves 11a, 11b (passive valve 11) which respectively open in an outflow direction from the pump chamber 2.

The first flow passage 8 and the second flow passage 9 are arranged so as to be capable of connecting to a methanol accommodating vessel 200 (hereinafter, referred to as an accommodating vessel). Concretely, the first flow passage 8 is arranged so as to be capable of connecting to the under side of the accommodating vessel 200 and the second flow passage 9 is arranged so as to be capable of connecting to the upper side of the accommodating vessel 200. The passive valve 10 is a normal valve, which is, for example, made of rubber and opens in only one direction by fluid pressure. The passive valve 10 is provided in the first flow passage 8 which is the inflow passage and thus the passive valve 10 opens when a pressure is applied in a suction direction of methanol directing to the pump chamber 2 but does not open even when a pressure is applied in a discharge direction of methanol directing to the accommodating vessel 200. On the other hand, the passive valve 11 is also a normal valve, which is, for example, made of rubber and the passive valve 11 is provided in the second flow passage 9, which is the outflow passage. The passive valve 11 opens when a pressure is applied in a discharge direction of methanol directing to the accommodating vessel 200 but does not open even when a pressure is applied in a suction direction of methanol directing to the pump chamber 2. Therefore, methanol is sucked to the pump chamber 2 from the accommodating vessel 200 through the first flow passage 8 and the inflow passage 3, and is discharged from the pump chamber 2 to the accommodating vessel 200 through the inflow passage 3 and the second flow passage 9. In the embodiment of the present invention, the first flow passage 8a and the second flow passage 9a, and the first flow passage 8b and the second flow passage 9b are respectively connected to different accommodating vessels 200a and 200b.

The inflow side active valves 5a, 5b are capable of being individually opened or closed by a drive actuator (not shown in FIG. 1).

Eight outflow passages 4a through 4h are respectively connectable to eight cells 301 as power generating parts of the direct methanol fuel cell (DMFC) 100. The methanol discharged from the outflow passages 4a through 4h are capable of being supplied to the anode electrodes 304 of the cells 301.

The fuel cell (DMFC) 100 in this embodiment is, like a conventional fuel cell as described above, provided with a power generating device 300 having cells 301 and an accommodating container 200 for methanol or methanol aqueous solution. The cell 301 includes an anode electrode (fuel electrode) 304 having an anode collector 302 and an anode catalyst layer 303, a cathode electrode (air electrode) 307 having a cathode collector 305 and a cathode catalyst layer 306, and an electrolyte membrane 308 which is disposed between the anode electrode 304 and the cathode electrode 307. Methanol is supplied to the anode electrode 304 by a pump 1 as a liquid feed pump and air is supplied to the cathode electrode 307 by an air supply pump 309.

The outflow side active valves 6a through 6h are individually openable/closable by a drive actuator (not shown in FIG. 1) similarly to the inflow side active valves 5a, 5b.

The movable body 13 in this embodiment of the present invention is a piston (hereinafter, referred to as a piston 13) which is reciprocated within a cylinder 14 connected to the pump chamber 2. The piston 13 is fixed on the upper end of a piston rod 15 in the drawing. The piston rod 15 is connected to a drive actuator (not shown in FIG. 1) and is reciprocated within the cylinder 14 by the drive actuator.

In this pump 1 constructed as described above, when the outflow side active valves 6a through 6h are in a closed state and at least one of the inflow side active valves 5a, 5b is in an open state, the piston 13 moves downward in the drawing and methanol is sucked into the pump chamber 2. On the other band, when the inflow side active valves 5a, 5b are in a closed state and at least one of the outflow side active valves 6a through 6h is in an open state, the piston 13 moves upward in the drawing and the methanol is discharged to a cell 301 from the pump chamber 2. When the outflow side active valves 6a through 6h are in a closed state and at least one of the inflow side active valves 5a, 5b is in an open state and, in this state, when the piston 13 moves upward in the drawing, the methanol is discharged to the accommodating vessel 200. A concrete control method for the pump 1 will be described in detail below.

The concrete structure of the multi-channel pump 1 provided with the above-mentioned basic structure will be described below. FIG. 2 is a perspective view showing the concrete structure of the multi-channel pump shown in FIG. 1 that is viewed from the discharge side of methanol. FIG. 3 is a perspective view showing the multi-channel pump shown in FIG. 2 that is viewed from the "X" direction. FIG. 4 is a perspective view showing the multi-channel pump shown in FIG. 2 which is cut in the "Y" cross section. FIG. 5 is an exploded perspective view showing an opening/closing mechanism of active valves of the multi-channel pump shown in FIG. 2. FIG. 6 is a plan view showing the structure of inflow passages and outflow passages of the multi-channel pump shown in FIG. 2.

In the pump 1 shown in FIGS. 2 through 4, a base part 24 and a bracket 31 are connected to each other with screws through four pole braces 32 to construct a main body frame. On a base plate 25 and a bracket 31 constructing the base part 24 are fixed and held a driving mechanism for the piston 13 and an opening/closing mechanism for the inflow side active valves 5a, 5b and the outflow side active valves 6a through 6h. The arrows in FIG. 4 show an example of the flowing of methanol in the pump 1.

The bracket 31 is provided with a semi-cylindrical extended part 31a which is extended downward in FIG. 2. On the inner peripheral side of the extended part 31a are formed concave grooves 31b, 31b at two positions by a pitch of approximately 180° which construct the detent portion of the piston 13 along with protruded parts 18a of a slide plate 18 described below.

The base part 24 includes a base plate 25, in which the pump chamber 2, the inflow passages 3, the outflow passages 4, the first flow passages 8 and the second flow passages 9 are formed, an active valve plate 29 integrally provided with the inflow side active valves 5 and the outflow side active valves 6, a valve presser plate 26 pressing the active valve plate 29, a port 27 formed with outflow ports 40 (40a through 40h) which are aperture ends of the outflow passages 4, suction ports 80 (80a, 80b) which are aperture ends of the first flow passages 8, and discharge ports 90 (90a, 90b) which are aperture ends of the second flow passages 9, and a port presser plate 28 pressing the port 27. The valve presser plate 26, the active valve plate 29, the base plate 25, the port 27, and the port presser plate 28 are laminated in this order.

The piston 13 is moved so as to be reciprocated in the inside of the cylinder 14 by a piston drive motor 51. The cylinder 14 is integrally formed with the base plate 25 so as to be connected to the pump chamber 2 (see FIG. 4). The structure of the driving mechanism for the piston 13 will be described below.

The piston drive motor 51 is concretely a stepping motor and fixed to the bracket 31 with a screw. In this embodiment of the present invention, the piston drive motor 51 rotates in forward and reverse directions. A small gear 53 is fixed on the tip end of the output shaft of the piston drive motor 51. An idle gear 19 is rotatably supported by a fixed shaft 20 which is fixed to the bracket 31 so as to be engaged with the small gear 53. A gear 17 is rotatably held by a bearing 61 which is fixed on the outer peripheral part of the cylinder 14 so as to be engaged with the idle gear 19.

The gear 17 is formed in an approximately bottomed cylindrical shape. On the center portion of the bottom part of the gear 17 is fixed a nut 16 as a rotation body on which a female screw 16a is formed. On the other hand, a male screw 15a is formed on the outer peripheral part of the piston rod 15 to which the piston 13 is fixed on one end and the male screw 15a is threadedly engaged with the female screw 16a. Further, on the other end of the piston rod 15 is fixed a slide plate 18 in which the protruded parts 18a, 18a engaging with the concave grooves 31b formed in the extended part 31a of the bracket 31 are formed at two positions by a pitch of approximately 180° (see FIG. 3). The rotation of the piston 13 is prevented by the protruded parts 18a and the concave grooves 31b.

On the outer peripheral side of the piston 13 are fixed sealing members (oil-seal) 63, 63 for preventing the leakage of methanol which is sucked in the pump chamber 2.

In the driving mechanism for the piston 13 constructed as described above, when the piston drive motor 51 is rotated the driving force is transmitted to the gear 17 through the small gear 53 and the idle gear 19. When the driving force of the piston drive motor 51 is transmitted to the gear 17, the nut 16 is rotated together with the gear 17. The rotation preventing or detent mechanism for the piston 13 is structured on the other end side of the piston rod 15 on which the male screw 15a is formed to engage threadedly with the female screw 16a of the nut 16. Therefore, the rotary motion of the nut 16 is converted into the straight motion of the piston 13. The piston 13 is reciprocated in the inside of the cylinder 14 by the piston drive motor 51 that rotates in the both directions.

The inflow side active valves 5 and the outflow side active valves 6 are capable of being individually opened or closed by a valve opening/closing drive motor 52. The opening/closing mechanism of the inflow side active valves 5 and the outflow side active valves 6 includes a cam 36 and a plate spring 37 in addition to the valve opening/closing drive motor 52 as principal components (see FIG. 5). The structure of the opening/closing mechanism for the inflow side active valves 5 and the outflow side active valves 6 will be described below.

The valve opening/closing drive motor 52 is concretely a stepping motor which is fixed to the bracket 31 with a screw. In this embodiment of the present invention, the valve opening/closing drive motor 52 rotates in one direction (counter clockwise direction in FIG. 5). A small gear 54 is fixed at the tip end of the output shaft of the valve opening/closing drive motor 52. A cam 36 is provided with a gear 36a engaging with the small gear 54 and rotatably supported by a bearing 62 that is fixed on the outer peripheral part of the cylinder 14. In the embodiment of the present invention, the cam 36 is rotated by the valve opening/closing drive motor 52 in the clockwise direction in FIG. 5. The bearing 61 and the bearing 62 are fixed on the outer peripheral part of the cylinder 14 such that they overlap each other in the moving direction of the piston 13. The cam 36 and the gear 17 are disposed so as to overlap each other in the moving direction of the piston 13 (see FIG. 4).

The cam 36 is formed in a cylindrical shape and provided with a flange part. The gear 36a is formed on the outer peripheral face of the flange part of the cam 36. On the outer peripheral face of the cam 36 is fixed a pin 38 protruding in the radial direction for causing the inflow side active valves 5 and the outflow side active valves 6 to open and close.

The plate spring 37 includes, as shown in FIG. 5, a ring-shaped center part 37a, ten arm parts 37b extended from the center part 37a outward in the radial direction in a spiral manner, valve holding parts 37c respectively formed at the tip end of the arm part 37b, and a tip end part 37d which is formed so as to be bent upward in the drawing from the outer end of the valve holding part 37c in the radial direction and then bent toward the center part 37a. The tip end part 37d is provided with a sliding part 37d1 capable of contacting with the pin 38 and a guide part 37d2 which is bent from the sliding part 37d1 obliquely upward in the drawing to guide the pin 38 to the sliding part 37d1. The notational symbols are shown for some of the arm parts 37b, the valve holding parts 37c, and the tip end parts 37d of the plate spring 37 for convenience.

The plate spring 37 is fixed to the outer peripheral face of the cylinder 14 through its center part 37a. In the state that the plate spring 37 is fixed to the outer peripheral face of the cylinder 14 and the cam 36 is supported by the bearing 62 fixed on the outer peripheral part of the cylinder 14, the pin 38 is positioned on the upper side of the under face of the sliding part 37d1 and on the under side of the upper end portion of the guide part 37d2 in the vertical direction in FIG. 5. Therefore, when the cam 36 is rotated, the pin 38 is guided to the under face of the sliding part 37d1 through the guide part 37d2, and the arm part 37b is deflected and thus the valve holding part 37c and the tip end part 37d are lifted upward in FIG. 5.

The active valve plate 29 is made, for example, of rubber and integrally provided with the inflow side active valves 5a, 5b and the outflow side active valves 6a through 6h which are concentrically formed with a pitch of equal angle. The inflow side active valves 5a, 5b and the outflow side active valves 6a through 6h are normally urged to be in a closed state by the elasticity of rubber of the active valve plate 29. Concretely, they are urged downward in FIG. 5. In addition, the upper ends of the inflow side active valves 5a, 5b and the outflow side active valves 6a through 6h are respectively held by the valve holding parts 37c of the plate spring 37.

In the opening/closing mechanism of the inflow side active valves 5 and the outflow side active valves 6 constructed as described above, the driving force of the valve opening/closing drive motor 52 is transmitted to the gear 36a through the small gear 54. When the driving force is transmitted to the gear 36a, the cam 36 is rotated and the pin 38 is also rotated together with the cam 36. The pin 38 is guided to the under face side of the sliding part 37d1 through the guide part 37d2, which causes the arm part 37b to be deflected, and the valve holding part 37c is lifted upward in FIG. 5. In other words, either one of the inflow side active valves 5a, 5b or the outflow side active valves 6a through 6h which are held in the valve holding parts 37c is lifted upward to be in an open state. When the pin 38 is further rotated and disengaged from the under face of the sliding part 37d1, the active valve in the open state becomes to be in a closed state by the urging force. When the pin 38 is further rotated, the pin 38 is glided by the succeeding guide part 37d2 to the under face side of the sliding part 37d1 and the succeeding active valve becomes in an open state similarly to the above-mentioned case. These operations are repeated and the inflow side active valves 5a, 5b and the outflow side active valves 6a through 6h which are respectively held in the valve holding parts 37c are successively opened and closed.

The pump chamber 2, the inflow passages 3, the outflow passages 4, the first flow passages 8 and the second flow passages 9 are formed in the base plate 25 as described above.

The pump chamber 2 is formed in an approximately central part of the base plate 25 and provided with ten passages which radially extend toward the inflow side active valves 5a, 5b and the outflow side active valves 6a through 6h (see FIG. 6). A detector (not shown) for detecting the presence of bubbles may be provided in the pump chamber 2.

The outflow passages 4a through 4h are formed so as to direct from the outflow side active valves 6a through 6h toward the outer side of the base plate 25. The inflow passages 3a, 3b are respectively formed between the inflow side active valves 5a, 5b and the passive valves 10a and 11a, 10b and 11b formed in an umbrella-shape (see FIGS. 4 and 6). In addition, the first passages 8a, 8b are respectively formed on the outer side of the passive valves 10a, 10b and the second passages 9a, 9b are formed on the outer side of the passive valves 11a, 11b.

FIG. 7 is a timing chart showing the control method of the multi-channel pump in FIG. 2.

In the embodiment of the present invention, the pump 1 is controlled by a control method including a suction step "S1" in which the inflow side active valve 5 is opened and methanol is sucked into the pump chamber 2 from the first flow passage 8 by a suction operation of the piston 13, an initial discharge step "S2" after the suction step "S1" in which the backlash of the pump 1 is eliminated by means of that methanol is discharged from the pump chamber 2 to the second flow passage 9 by the discharge operation of the piston 13 and then the inflow side active valve 5 is closed, and a discharge step "S3" after the initial discharge step "S2" in which an outflow side active valve 6 is successively opened and a prescribed amount of methanol is discharged by the discharge operation of the piston 13. The control method will be described in detail below.

In the timing chart for the piston drive motor 51 in FIG. 7, the portions on the under side of the center horizontal line where the hatching is applied indicate states of a discharge operation in which the piston 13 is operated in the discharge direction (left direction in FIG. 4). The portion on the upper side of the center horizontal line where the hatching is applied indicates the state of a suction operation in which the piston 13 is operated in the suction direction (right direction in FIG. 4). In the timing chart for the valve opening/closing drive motor 52, the portions where the hatching is applied indicate states in which the respective active valves are opened.

In the initial state, all of the inflow side active valves 5 and the outflow side active valves 6 are in the closed state. First the valve opening/closing drive motor 52 is driven to make the inflow side active valve 5b to be in an open state. After that, the piston 13 is moved in the discharge direction of methanol by the piston drive motor 51. The discharge operation by the piston 13 is performed to the top dead point (home position) and the origin-reset of the piston 13 is performed (origin-reset step "S0"). In this case, methanol is discharged to the second flow passage 9b from the pump chamber 2 through the passive valve 11b which is capable of being in an open state.

Next, methanol is sucked into the pump chamber 2 (suction step "S1"). Concretely, under the open state of the inflow side active valve 5b, the piston drive motor 51 is driven to move the piston 13 in the suction direction of methanol. The suction operation of the piston 13 is performed, for example, to the bottom dead point of the piston 13. Methanol is sucked into the pump chamber 2 from the first flow passage 8b through the passive valve 10b which is capable of being in an open state by the suction operation of the piston 13.

Next, after the backlash of the pump 1 is eliminated by means of that methanol is discharged from the pump chamber 2 by the discharge operation of the piston 13, the inflow side active valve 5b is closed (initial discharge step "S2"). Concretely, under the open state of the inflow side active valve 5b, the piston 13 is moved in the discharge direction of methanol by the piston drive motor 51 until the backlash of pump 1 is eliminated. Methanol is discharged to the second flow passage 9b by the discharge operation of the piston 13 through the passive valve 11b which comes to be in an open state, and after that the inflow side active valve 5b is closed by the valve opening/closing drive motor 52.

Next, a prescribed outflow side active valve 6 is successively opened and a predetermined amount of methanol is discharged by the discharge operation of the piston 13 (discharge step "S3"). Concretely, first, the outflow side active valve 6f is set to be in an open state by the valve opening/closing drive motor 52, and the discharge operation of the piston 13 is performed by the piston drive motor 51 to discharge a predetermined amount of methanol to the outflow passage 4f. After then, the outflow side active valve 6f is set to be in a closed state and the outflow side active valve 6g is set to be in an open state by the valve opening/closing drive motor 52 and the discharge operation of the piston 13 is performed to discharge a predetermined amount of methanol from the outflow passage 4g. In this manner, while the opening/closing operations of the outflow side active valves 6f, 6g, 6h, 6a, 6b, 6c, 6d, 6e are successively performed by the valve opening/closing drive motor 52 in this order, a prescribed amount of methanol is discharged from the outflow passages 4f, 4g, 4h, 4a, 4b, 4c, 4d, 4e by the discharge operation of the piston 13 in this order.

In the case that a detector for detecting the presence of bubbles is provided in the pump chamber 2, when the detector detects bubbles, the discharge operation of the piston 13 is, for example, performed under the state that the inflow side active valve 5b is set to be in an open state. The bubbles can be discharged to the second flow passage 9b through the passive valve 11b capable of being in an open state. Further, at the starting time of the pump 1 or after the exchange of the accommodating vessel, bubbles can be discharged by performing similar operations.

When the structure of the multi-channel pump 1 shown in FIGS. 2 through 6 is employed, the opening/closing operation of the inflow side active valve 5a, which is not used in a series of the above-mentioned operations, is also performed by the valve opening/closing drive motor 52. However, a series of the above-mentioned operations are not affected even when the inflow side active valve 5a is set to be in an open state unless the piston 13 is not moved.

As described above, the multi-channel pump 1 in accordance with the embodiment of the present invention is provided with the outflow side active valves 6a through 6h. Therefore, the reverse flow of methanol from the outflow passages 4a through 4h to the pump chamber 2 can be surely prevented. Further, the discharge destinations of methanol which is discharged from the outflow passages 4a through 4h can be controlled by the outflow side active valves 6a through 6h. In addition, in the multi-channel pump 1, methanol is discharged from the respective outflow passages 4a through 4h by the discharge operation of one piston 13. Therefore, discharging performance is uniform in comparison with the case when pistons are provided for the respective outflow passages 4a through 4h and thus the variation of discharge amount from the respective outflow passages 4a through 4h can be restrained. Accordingly, an appropriate amount of methanol can be accurately discharged in the multi-channel pump 1.

In the embodiment of the present invention, two inflow passages 3a, 3b are connected to the pump chamber 2 to which eight outflow passages 4a through 4h are connected. Therefore, the inflow passages 3a, 3b can be commonly used for a plurality of outflow passages 4a through 4h and thus the structure of the pump 1 can be simplified. Further, since only one piston 13 is used and thus the structure of the pump 1 can be further simplified. Accordingly, the downsizing of the pump 1 can be attained and thus the pump 1 can be mounted in a small-sized device such as, for example, a direct methanol fuel cell (DMFC) used in a portable electronic device.

In the embodiment of the present invention, the drive mechanism for the piston 13 includes a piston rod 15 on which a male screw 15a is formed on its outer peripheral part, a nut 16 on which a female screw 16a for threadedly engaging with the male screw 15a is formed, and a piston drive motor 51 which rotationally drives the nut 16 through a gear 17 and the like. Therefore, the moving quantity of the piston 13 can be controlled with the pitch of the screw and the quantity of rotation of the piston drive motor 51. Accordingly, a minute flow rate can be discharged from the outflow passages 4a through 4h. Further, the accuracy of a discharge flow rate can be enhanced. Especially, in the embodiment of the present invention, since the piston drive motor 51 is a stepping motor, the moving quantity of the piston 13 can be further accurately controlled. For example, in the pump 1 in accordance with the embodiment of the present invention, a minute flow rate such as, for example, 0.01 cc can be accurately discharged from the respective outflow passages 4a through 4h Further, a minute flow rate can be intermittently discharged.

In the embodiment of the present invention, the multi-channel pump 1 is provided with two inflow passages 3a, 3b. Therefore, when accommodating vessels are connected to the respective inflow passages 3a, 3b, the exchanging work of the accommodating vessel becomes easy.

In the embodiment of the present invention, the one end sides of the inflow passages 3a, 3b are connected to the pump chamber 2 through the inflow side active valves 5a, 5b. Therefore, the reverse flow from the pump chamber 2 to the inflow passages 3a, 3b can be surely prevented.

In the control method for the multi-channel pump 1 in the embodiment of the present invention, the initial discharge step "S2" for eliminating the backlash of the pump 1 is provided between the suction step "S1" and the discharge step "S3". Therefore, in the discharge step "S3", the relationship between the moving quantity of the piston 13 and the discharge amounts from the outflow passages 4a through 4h can be maintained in a linear manner from the beginning. Accordingly, when the moving quantity of the piston 13 is appropriately controlled, the discharge amount of the fluid from the outflow passage 4f which is firstly discharged in the discharge step "S3" can be also accurately controlled and thus the variation of the discharge amounts from the respective outflow passages 4a through 4h can be reduced.

In addition, in the control method for the multi-channel pump 1 in accordance the embodiment of the present invention, methanol is sucked in the suction step "S1" which is required to discharge from the outflow passages 4a through 4h by a plurality of times in the discharge step "S3". Therefore, even when the discharge amount of methanol which is discharged from the respective outflow passages 4a through 4h is a significantly small amount the suction amount can be ensured to some extent. For example, even when each of the discharge amounts from the respective outflow passages 4a through 4h is 1 (μl), the suction amount can be totally 8 (μl). Accordingly, the capacity of the pump 1 can be increased and the self-feeding performance can be easily attained.

Although the present invention has been shown and described with reference to specific embodiments, various changes and modifications will be apparent to those skilled in the art from the teachings herein.

For example, the multi-channel pump 1 in accordance with an embodiment of the present invention is a piston type pump in which the piston 13 is used as a movable body. However, the present invention is not limited to a piston type pump and a diaphragm type pump provided with only one movable body may be used. Further, the present invention may be applied to other types of pump.

Further, in the embodiment of the present invention, the inflow side active valves 5 and the outflow side active valves 6 are driven so as to be opened or closed by the valve opening/closing drive motor 52 which is a common drive actuator. However, drive actuators may be provided for each of the respective active valves or a plurality of drive actuators may be provided each of which opens and closes some of the active valves.

In addition, the piston drive motor 51 is not limited to a stepping motor and may utile other types of a motor. Further, the drive actuator for the piston 13 is not limited to a motor and various types of a drive actuator may be used.

In addition, in the embodiment of the present invention, two inflow passages 3a, 3b are provided, but only one inflow passage may be provided. On the other hand, three or more inflow passages may be provided.

Further, the control method for the multi-channel pump 1 is not limited to the above mentioned control method. For example, the pump 1 may be controlled by a control method which includes a suction step in which the inflow side active valve 5 is opened and methanol is sucked into the pump chamber 2 by the suction operation of the piston 13 and then the inflow side active valve 5 is closed, an initial discharge step after the suction step in which one of the outflow side active valves 6 is opened and the methanol is discharged from the pump chamber 2 by the discharge operation of the piston 13 to eliminate the backlash of the pump 1, and a discharge step after the initial discharge step in which an outflow side active valve 6 is successively opened and a prescribed amount of methanol is discharged by the discharge operation of the piston 13.

Also in this case, the initial discharge step for eliminating the backlash of the pump 1 is provided between the suction step and the discharge step. Therefore, in the discharge step, the relationship between the moving quantity of the piston 13 and the discharge amount from the outflow passage 4 can be maintained in a linear manner from the beginning. Thus, the variation of the discharge amounts from the respective outflow passages 4 can be reduced. In addition, methanol is collectively sucked in the suction step which is required to discharge from the outflow passage 4 by a plurality of times. Therefore, even when the discharge amount of methanol which is discharged from the respective outflow passages 4 is a significantly small amount, the suction amount can be ensured to some extent. Accordingly, the capacity of the pump 1 can be increased and the self-feeding performance can be easily attained The fluid used is not limited to methanol and methanol aqueous solution. Ethanol (ethyl-alcohol) and its aqueous solution or another liquid may be used.

The application of the multi-channel pump in accordance with the embodiment of the present invention is not limited to a fuel cell. For example, the multi-channel pump may be used in the field of an analyzing device for chemical substance and may be used in substitution for a plurality of cylinder pump which is used in a dropping device of trace reagent.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A fuel cell comprising:
   a cell comprising:
     an anode electrode comprising an anode collector and an anode catalyst layer;
     a cathode electrode comprising a cathode collector and a cathode catalyst layer; and
     an electrolyte membrane which is disposed between the anode electrode and the cathode electrode;
   a liquid feed pump for supplying liquid to the anode electrode; and
   an air supply pump for supplying air to the cathode electrode;
   wherein the liquid feed pump is a multi-channel pump comprising:
     a pump chamber;
     an inflow passage for fluid which is connected to the pump chamber;
     an inflow side active valve through which the inflow passage is connected to the pump chamber
     two or more outflow passages which are connected to the pump chamber;
     outflow side active valves which are provided so as to correspond to the outflow passages; and
     a movable body for changing a volumetric capacity of the pump chamber; and
   wherein the movable body is reciprocated to change the volumetric capacity of the pump chamber.

2. The fuel cell according to claim 1, wherein the liquid is methanol or methanol aqueous solution.

3. The fuel cell according to claim 1, wherein a number of the movable body in the liquid feed pump is one.

4. The fuel cell according to claim 1, wherein the movable body is a piston which is reciprocated within a cylinder that is connected to the pump chamber.

5. The fuel cell according to claim 4, wherein the liquid feed pump further comprises:
   a piston rod to which the piston is fixed;
   a male screw formed on an outer peripheral part of the piston rod;
   a rotation body which is formed with a female screw that threadedly engages with the male screw to make the piston reciprocate; and
   a piston drive motor which drives the rotation body to rotate.

6. The fuel cell according to claim 5, wherein the liquid feed pump further comprises:
   a protruded part which is formed in the piston rod, and
   a recessed part provided in a bracket which is integrally structured with the piston drive motor,
   wherein the protruded part is engaged with the recessed part to prevent rotation of the piston.

7. The fuel cell according to claim 5, wherein the piston drive motor is a stepping motor.

8. The fuel cell according to claim 1, wherein the inflow passage comprises two or more inflow passages.

9. The fuel cell according to claim 8, wherein
   the pump chamber is formed at a roughly center portion of a base plate in which the two or more inflow passages and the two or more outflow passages are formed, and
   the two or more inflow passages and the two or more outflow passages are formed from the pump chamber in a radial manner.

10. The fuel cell according to claim 1, wherein the liquid feed pump further comprises:
    a first flow passage provided in the inflow passage and having a passive valve which is capable of opening in an inflow direction to the pump chamber, and
    a second flow passage provided in the inflow passage and having a passive valve which is capable of opening in an outflow direction from the pump chamber.

11. The fuel cell according to claim 10, wherein
    the first flow passage and the second flow passage are connected to an accommodating container in which methanol or methanol aqueous solution is accommodated, and
    the first flow passage is connected with a lower part of the accommodating container and the second flow passage is connected with an upper part of the accommodating container.

12. The fuel cell according to claim 1, wherein
    the inflow passage comprises two or more inflow passages, and
    at least one of the inflow passages is connected to a first accommodating container in which methanol or methanol aqueous solution is accommodated, and
    another of the inflow passages is connected with a second accommodating container.

13. The fuel cell according to claim 10, wherein an outflow port which is an aperture end of the outflow passage, an suction port which is an aperture end of the first flow passage and a discharge port which is an aperture end of the second flow passage are formed in a same direction.

14. The fuel cell according to claim 1, further comprising a detector for detecting presence of a bubble in the pump chamber.

15. A control method of a fuel cell comprising:
providing a fuel cell comprising:
a cell comprising:
an anode electrode comprising an anode collector and an anode catalyst layer;
a cathode electrode comprising a cathode collector and a cathode catalyst layer; and
an electrolyte membrane which is disposed between the anode electrode and the cathode electrode;
a liquid feed pump for supplying liquid to the anode electrode; and
an air supply pump for supplying air to the cathode electrode;
wherein the liquid feed pump is a multi-channel pump comprising:
a pump chamber;
an inflow passage for fluid which is connected to the pump chamber;
two or more outflow passages which are connected to the pump chamber;
outflow side active valves which are provided so as to correspond to the outflow passages;
a movable body for changing a volumetric capacity of the pump chamber, the movable body being reciprocated to change the volumetric capacity of the pump chamber; and
an inflow side active valve through which the inflow passage is connected to the pump chamber;
opening, the inflow side active valve;
sucking the fluid into the pump chamber by a suction operation of the movable body;
closing the inflow side active valve; and
successively opening predetermined outflow side active valves to discharge a specified quantity of the fluid by discharge operation of the movable body
wherein the successively opening predetermined outflow side active valves is performed after the opening the inflow side active valve, the sucking the fluid into the pump chamber, and the closing the inflow side active valve.

16. The control method of a fuel cell according to claim 15, wherein opening one of the outflow side active valves to discharge the fluid from the pump chamber with the discharge operation of the movable body for eliminating a backlash of the pump.

17. A control method of a fuel cell comprising:
providing a fuel cell comprising:
a cell comprising:
an anode electrode comprising an anode collector and an anode catalyst layer;
a cathode electrode comprising a cathode collector and a cathode catalyst layer; and
an electrolyte membrane which is disposed between the anode electrode and the cathode electrode;
a liquid feed pump for supplying liquid to the anode electrode; and
an air supply pump for supplying air to the cathode electrode;
wherein the liquid feed pump is a multi-channel pump comprising:
a pump chamber;
an inflow passage for fluid which is connected to the pump chamber;
two or more outflow passages which are connected to the pump chamber;
outflow side active valves which are provided so as to correspond to the outflow passages;
a movable body for changing a volumetric capacity of the pump chamber, the movable body being reciprocated to change the volumetric capacity of the pump chamber;
an inflow side active valve through which the inflow passage is connected to the pump chamber;
a first flow passage provided in the inflow passage and having a passive valve which is capable of opening in an inflow direction to the pump chamber; and
a second flow passage provided in the inflow passage and having a passive valve which is capable of opening in an outflow direction from the pump chamber;
opening the inflow side active valve;
sucking the fluid from the first flow passage into the pump chamber by a suction operation of the movable body; and
successively opening predetermined outflow side active valves to discharge a specified quantity of the fluid by discharge operation of the movable body;
wherein the successively opening predetermined outflow side active valves is performed after the opening the inflow side active valve and the sucking the fluid into the pump chamber.

18. The control method of a fuel cell according to claim 17, wherein the successively opening predetermined outflow side active valves comprises opening one of the outflow side active valves to discharge the fluid from the pump chamber with the discharge operation of the movable body for eliminating a backlash of the pump.

* * * * *